United States Patent [19]

Horwath

[11] Patent Number: 5,529,262
[45] Date of Patent: Jun. 25, 1996

[54] GUIDANCE SEEKER FOR SMALL SPINNING PROJECTILES

[76] Inventor: Tibor G. Horwath, 20 Cessna La., Falmouth, Va. 22405

[21] Appl. No.: 417,398

[22] Filed: Apr. 5, 1995

Related U.S. Application Data

[63] Continuation-in-part of Ser. No. 79,790, Jun. 23, 1993, abandoned.

[51] Int. Cl.⁶ ................................. F41G 7/26; F41G 7/00
[52] U.S. Cl. .................... 244/3.16; 244/3.19; 250/203.7; 342/62
[58] Field of Search ................................ 244/3.16, 3.19; 250/203.7; 102/384; 342/62

[56] References Cited

U.S. PATENT DOCUMENTS

| | | | |
|---|---|---|---|
| 2,942,118 | 6/1960 | Gedance | 250/203.7 |
| 3,143,654 | 8/1964 | Aroyan et al. | 250/203.7 |
| 4,006,356 | 2/1977 | Johnson et al. | 250/203.4 |
| 4,009,393 | 2/1977 | Ashley, Jr. et al. | 250/339.05 |
| 4,039,246 | 8/1977 | Voigt | 359/220 |
| 4,131,254 | 12/1978 | Underwood | 244/3.16 |
| 4,244,540 | 1/1981 | Vollmerhausen | 244/3.16 |
| 4,286,760 | 9/1981 | Coudere et al. | 244/3.16 |
| 4,320,402 | 3/1982 | Bowen | 343/700 M S |
| 4,438,893 | 3/1984 | Sands et al. | 244/3.21 |
| 4,561,611 | 12/1985 | Sinclair et al. | 244/3.16 |
| 4,562,439 | 12/1985 | Peralta et al. | 342/81 |
| 4,568,039 | 2/1986 | Smith et al. | 244/3.16 |
| 5,333,815 | 8/1994 | Sardonwsky | 244/3.16 |

Primary Examiner—Ian J. Lobo
Attorney, Agent, or Firm—Shlesinger, Arkwright, Garvey

[57] ABSTRACT

A guidance seeker for a spinning projectile defined by its angular momentum vector, comprises a lens system or a millimeter-wave antenna for receiving radiation derived from a target and forming an image of the target. The lens system has a reticle having a pattern of concentric circles nutating about the projectile angular momentum vector such that the received radiation is modulated by the target image as the image moves across the concentric circles. The millimeter-wave antenna generates concentric lobes nutating about the projectile angular momentum vector such that the received radiation is modulated by the target image as the image moves across the concentric lobes. A detector is coupled to the lens system or the antenna for receiving the modulated radiation. The detector is adapted to generate an output in response to the received modulated radiation. A circuit is provided to process the output from the detector to determine the deviation of the target image from the axis of the concentric circles or lobes.

29 Claims, 5 Drawing Sheets

TIME

FIG. 13

GUIDANCE SEEKER FOR SMALL SPINNING PROJECTILES

RELATED PATENT APPLICATION

This is a continuation-in-part application of application Ser. No. 08/079,790 filed Jun. 23, 1993 now abandoned.

FIELD OF THE INVENTION

The present invention relates generally to projectile guidance seekers and particularly to photoelectric and millimeter wave guidance seekers for small spinning projectiles.

BACKGROUND OF THE INVENTION

Inertial components for guided projectiles tended to be heavy, costly and large, thereby lending themselves for large and expensive guided projectiles. Past inertial components have been complex, relatively bulky and expensive. The inertial components of conventional guidance systems have lower limits imposed on weight, volume and cost of guided projectiles. In spite of the significant progress which has been achieved in miniaturizing such components, it is difficult to arrive at guided projectile realizations below about 1 kilogram of mass, 1 liter of volume and several thousand dollars in cost.

The present invention provides a guidance seeker that has very low cost and small size realization, making it particularly suitable for very small caliber spinning projectile applications.

OBJECTS AND SUMMARY OF THE INVENTION

It is an objective of the present invention to provide a guidance seeker for spinning and nutating projectiles that uses the projectile inertial properties as a guidance reference.

It is another object of the present invention to provide a guidance seeker of relatively very low cost, and small size realization, thereby to make it particularly suitable for very small caliber spinning projectile applications.

It is still another object of the present invention to provide a guidance seeker for spinning and nutating projectiles that can be implemented on a single silicon chip.

It is yet another object of the present invention to provide a guidance seeker that is suitable for a wide variety of small projectiles applications, from handgun projectiles to small missiles.

In summary, the present invention provides a guidance seeker that is suitable for very small caliber spinning projectile applications.

These and other objects of the present invention will become apparent from the following detailed description.

BRIEF DESCRIPTIONS OF THE DRAWINGS

FIGS. 4(a), 4(b), 4(c), 4(d), 4(e) and 4(f) show the detector output signals of the guidance seeker of FIG. 1 relative to a target image and the motions of the projectile and the variation of the line of sight vector relative to the optical axis of the guidance seeker.

DETAILED DESCRIPTION OF THE INVENTION

Figure 1:
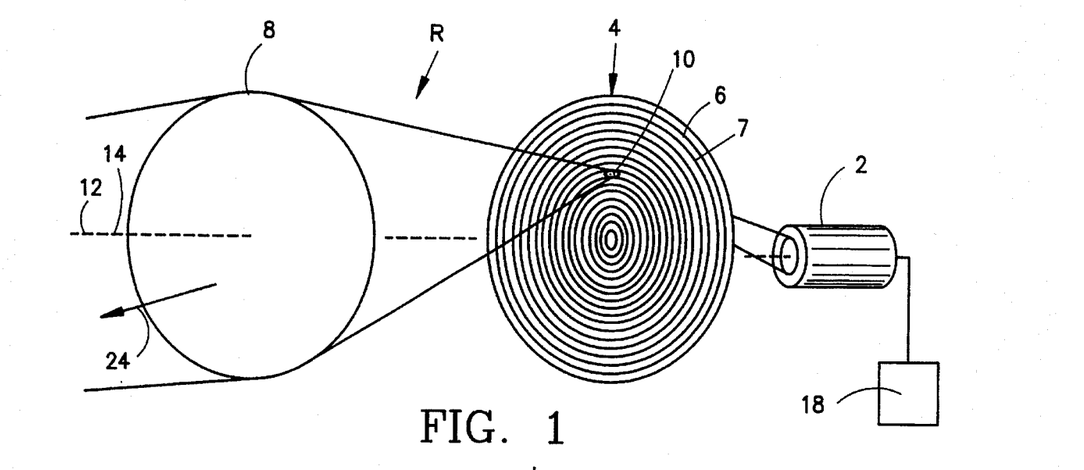
FIG. 1 is a schematic perspective view of a guidance seeker in accordance with the present invention.

A guidance seeker R in accordance with the present is disclosed in FIG. 1. The guidance seeker R comprises a single light sensitive device 2, such as a photodetector, a transparent reticle 4 having a pattern of concentric rings 6 and alternating spaces 7, and an objective lens 8. A distant target (not shown) creates an image 10 on the reticle 4, and light is transmitted through the reticle to the photodetector 2. The optical axis 12 of the guidance seeker R is coaxial with the longitudinal axis 14 of a projectile 16 (FIG. 3) in which the guidance seeker R is used. The output signal of the photodetector is fed to a signal processing circuit 18 to generate the required control signals for the projectile 16. It should be understood to a person of ordinary skill in the art that some elements which are not essential for the understanding of the invention, such as condenser lenses which maximize the throughput of light, etc., have not been shown for simplicity.

Light transmission through the reticle 4 varies from 0 when the target image is disposed on a reticle ring 6, to 100% when the target image is disposed on a space 7, as the target image 10 traverses the reticle radially. The transmission can vary abruptly for rings 6 with sharp boundaries, producing a square wave form at the detector 2. If the rings 6 and spaces 7 blend, such as would be the case for a raised cosine light transmission function, the wave form produced by the detector 2 would essentially be similar.

Figures 2A, 2B, 2C:
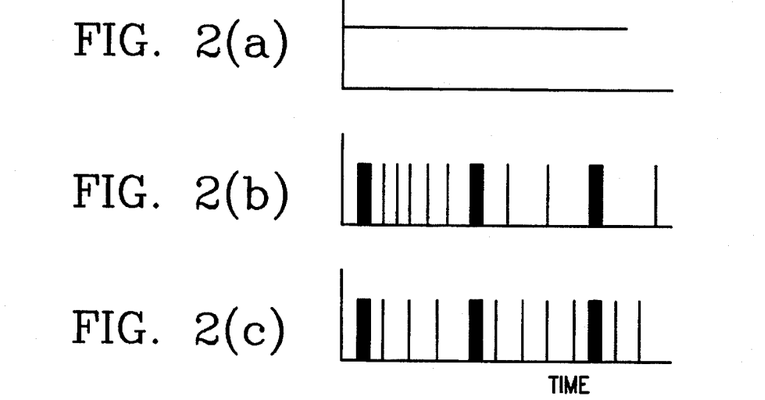
FIGS. 2(a), 2(b) and 2(c) show the detector output signals of the guidance seeker of FIG. 1 relative to a target image and the motions of the projectile and the variation of the line of sight vector relative to the optical axis of the guidance seeker.

For a distant target (not shown) which is fixed in space, a rotation of the guidance seeker R about its optical axis 12 will not produce a light intensity modulation at the detector 2, since the radial position of the image 10 will not change and no reticle circles 6 will be crossed, as best shown in FIG. 2(a). In other words, the image 10 of the target will remain either on a reticle ring 6 or in a space 7 between the rings 6, as a result of the circular symmetry of the reticle rings 6. The projectile spin will produce a circumferential motion for the image 10, thereby generating a constant detector output, as best shown in FIG. 2(a). On the other hand, motion of the image 10 across the reticle 4 due to drift of the target line of sight or nutation will produce light modulation at the detector 2 and generate an output, as best shown in FIGS. 2(b) and 2(c), respectively. Projectile nutation and line of sight drift will thus generate a signal at the detector 2.

Figure 3:
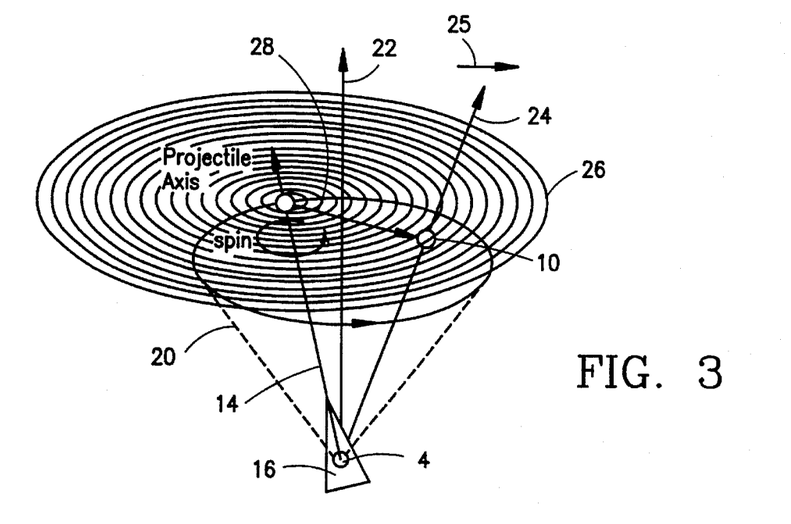
FIG. 3 is a schematic perspective view of the various vectors involved in the operation of the guidance seeker of FIG. 1.

Referring to FIG. 3, the guidance seeker R is disposed within the projectile 16 such that the guidance seeker R is stationary with respect to the projectile 16. The projectile 16 is spinning about its axis 14 and nutating about a nutation cone 20. The spinning and nutating motion of the projectile 16 gives it angular momentum represented by an angular momentum vector 22. The target (not shown) is determined by a line of sight vector 24. The positive direction of drift for the line of sight vector 24 is generally indicated at 25. The reticle 4 is shown projected in space, as generally indicated at 26, for ease of discussion that will follow.

Figures 4A, 4F:
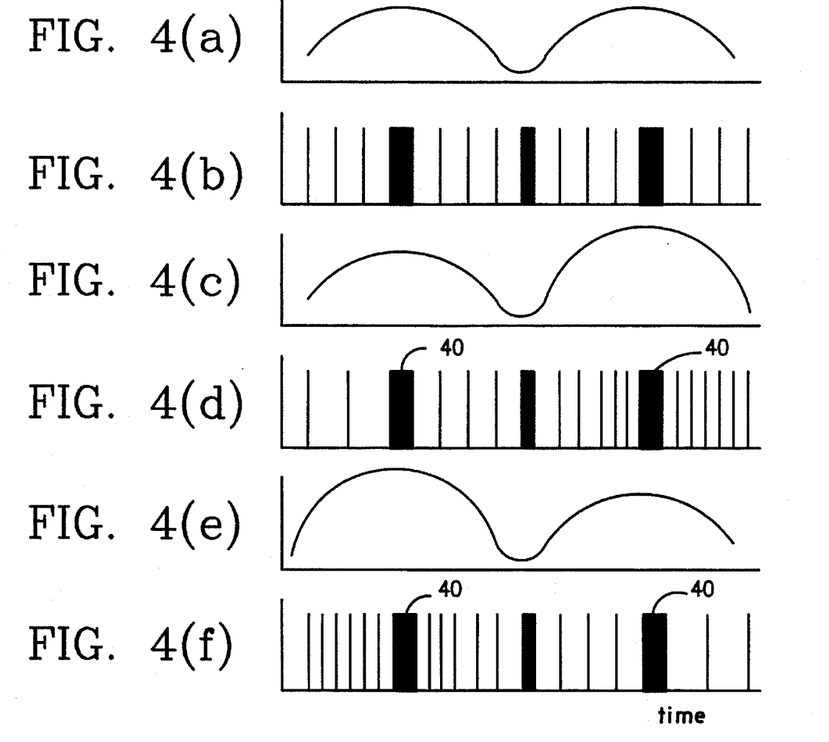

In the case of projectile nutation, with no simultaneous movement of the line of sight vector 24 to the target, the angle 28 between the instantaneous projectile axis 14 and the line of sight 24 to the target is a periodic function of constant amplitude, as best shown in FIG. 4(a). As the projectile axis 14 sweeps out the nutation cone 20, which is centered around the angular momentum vector 22 which is fixed in inertial space, the angular distance 28 between the projectile axis 14 and the line of sight vector 24 increases and decreases cyclically, returning to the original value after a complete cycle of 30 nutation, as best shown in FIG. 4(a). Since the target image 10 on the reticle 4 follows this motion, the light modulation at the detector 2 will be a sequence of pulses the number of which is equal to the number of reticle lines 6 crossed. For a constant rate of nutation, and a fixed line of sight vector 24, the number of pulses produced by the detector 2 per nutation cycle will be constant, as best shown in FIG. 4(b).

In the case of a changing line of sight vector 24, the angle between the instantaneous projectile axis 14 and the line of sight vector 24 to the target is still a periodic function, but no longer one of constant amplitude, as best shown in FIGS. 4(c) and 4(e). After a full nutation cycle, the angle 28 will not return to its original value, since the direction of the line of sight 24 has changed in the meantime. Instead, the amplitude of the periodic changes will increase or decrease depending on whether the line of sight vector 24 respectively moves away or towards the angular momentum vector 22, which is the axis of the nutation cone 20. The number of reticle line crossings by the image 10 of the target on the reticle 4 will exhibit analogous behavior, and the number of pulses per nutation cycle produced by the detector 2 will also no longer be constant, as best shown in FIGS. 4(d) and 4(f). The number of pulses per nutation cycle will change proportionally with the change of the direction of the line of sight vector 24 during the nutation cycle. The change of the pulse count per nutation cycle is thus proportional to the line of sight drift rate. The line of sight drift rate can therefore be measured simply by pulse counting, which is a very simple operation to implement for a person of ordinary skill in the art.

Figure 5:
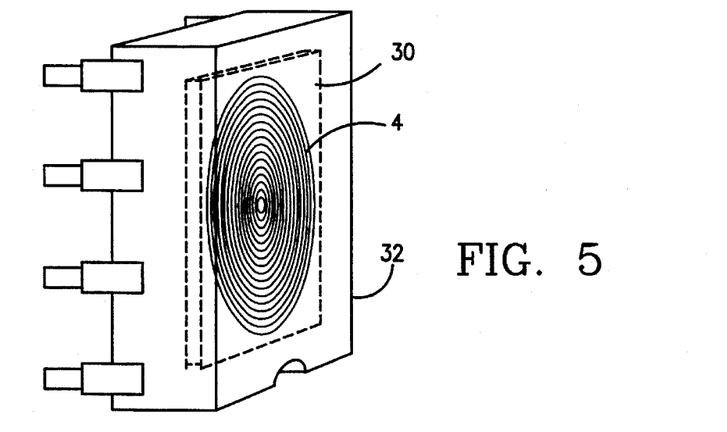
FIG. 5 is a schematic perspective view of the guidance seeker of FIG. 1 implemented on a silicon chip.

The guidance seeker R advantageously lends itself ideally to proportional guidance, since each output signal is inherently linearly dependent on the rate of change of the line of sight vector 24. The guidance seeker R is also an advantageously ideal device for very small and inexpensive projectile applications since the photodetector 2 and the pulse counting logic could all be implemented on a single monolithic silicon chip 30, as best shown in FIG. 5. The reticle 4 is deposited directly as a shadow mask over the detector area. The chip 30 is then placed inside a standard device package 32, such as the DIP-4, as best shown in FIG. 5. The monolithic implementation advantageously permits application of the guidance seeker R in high acceleration environment. The silicon chip 30 is disposed stationary with respect to the projectile.

Figure 6:
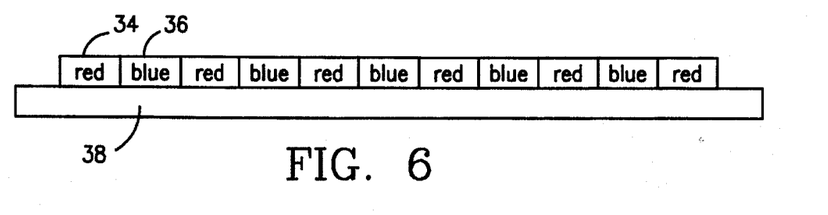
FIG. 6 is a cross-sectional view across the reticle of the guidance seeker of FIG. 1 using two color implementation.

The reticle rings 6 may also be implemented on the monolithic silicon chip 30 in a two color operation. The reticle 4 will include alternate rings 34 and 36 of two color interference filters, such as red and blue, deposited on the silicon detector substrate 38, as best shown in FIG. 6.

In addition to determining the target line of sight drift rate, the control of the spinning projectile 16 also requires the determination of the time phasing of guidance commands for the firing of course correcting thrusters. If circumferentially placed thrusters are used to effect projectile course changes, for example, then the precise times at which such thrusters are to be activated have to be determined. Methods for accomplishing this involve the determination of two events in the nutation and spin cycles of the projectile 16. The first event is the time at which the three vectors, the instantaneous projectile axis 14, the angular momentum vector 22 and the line of sight vector 24 are coplanar. The second event is the time at which the projectile thrusters have the correct orientation for producing a thrust in the direction of the target.

The first event takes place twice during the nutation cycle of the projectile 16, at the extremes of the cyclical variation of the instantaneous angle 28 between the projectile axis of 14 and the line of sight 24. At these extremes the direction of reticle crossings reverses, which is reflected as a short time gap 40 in the detector output pulse sequence, which is readily detectable, as best shown in FIGS. 4(d) and 4(f). The second event takes place as many times during the spin cycle as there are circumferential thrusters. To ascertain correct thruster alignment a circumferential encoding of the reticle has to be provided as well, which can be accomplished by radial lines (spokes), equal in number to the circumferential thrusters on the projectile.

Figure 7:
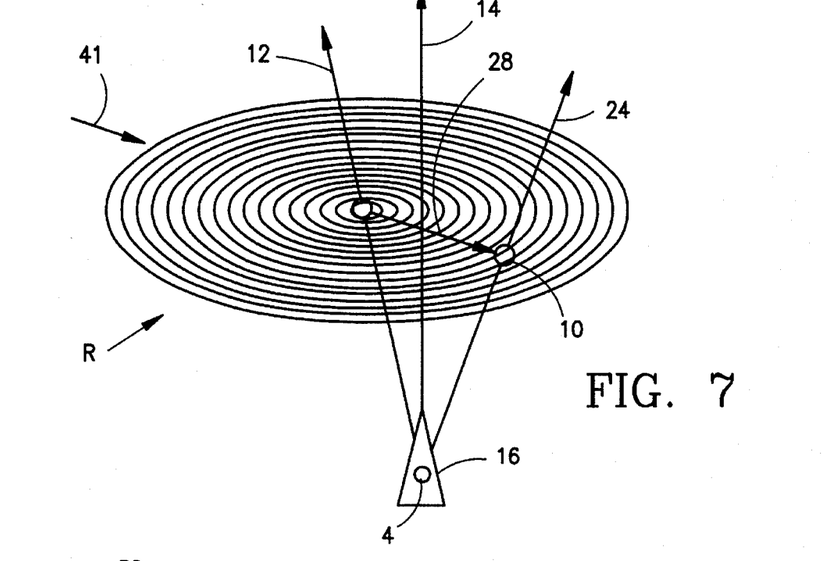
FIG. 7 is a schematic perspective view of the various vectors involved in the operation of the guidance seeker of FIG. 1 when disposed in a non-nutating projectile.

Thruster activation commands are applied when these two events coincide, or at least are as close in time as possible, as for example depicted by vector 41, as best shown in FIG. 7.

In the case when the spinning projectile 16 is not nutating, the projectile axis 14 and the angular momentum 22 are aligned. This can be considered as a special case where the nutation cone angle 20 is collapsed to zero. In this case there is no cyclical change of the instantaneous angle 28 between the projectile axis 14 and the line of sight vector 24 to the target. For a stationary line of sight vector 24 the detector 2 will produce no output pulses from which to derive guidance commands, as best shown in FIG. 2(a). If this condition were to prevail for the entire trajectory of the projectile 16, no guidance commands would be needed, since the projectile 16 would already be on an ideal intercept course with the target. Changes of the line of sight vector 24 would cause the reticle line crossing of the target image 10 to move in a radial direction, giving rise to an output pulse from the detector 2, every time a reticle line is crossed, as best shown in FIG. 2(c). In this case, the pulse count per unit time is again proportional to the line of sight drift rate, but the number of pulses per unit time would be much smaller than in the nutating case. The preferred application of the guidance seeker R is for non-nutating projectiles.

To compensate for the lack of nutation, the guidance seeker R where the optical axis 12 is not aligned with the projectile axis 14, is used in the projectile 16, as best shown in FIG. 7. The effect of such offset optical axis 12 (slightly side looking seeker) is similar to the effect of true nutation. In case of a projectile with a ratio of longitudinal to transversal moments of inertia of unity, the effect would be identical. The guidance seeker R is therefore suitable for guidance of spinning projectiles in general, irrespective of their nutational behavior. The side looking guidance seeker R also provides an output signal that contains divert thruster phasing information, as best shown in FIGS. 4(d) and 4(f). Long pulse in output signal can activate thruster, if projectile axis, optical axis, line of sight vector 24 and thruster axis are coplanar. Guidance data are generated at spin rate, rather than at the much slower nutation rate. The line of sight angle 28 is proportional to the pulse count, thereby making the guidance processor 18 a simple pulse counter.

The guidance seeker R is applicable for UV, visible and IR radiation.

Figure 8:
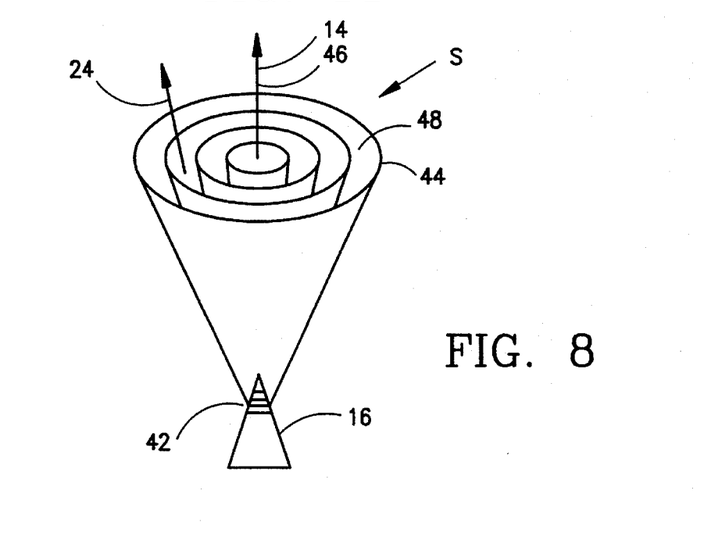
FIG. 8 is a schematic view of another embodiment of a guidance seeker utilizing millimeter wave concentric antenna lobes.

Another embodiment of the present invention is disclosed as a millimeter wave guidance seeker S, as best shown in FIG. 8. Although the components of the guidance seeker S are different from the guidance seeker R, the principle of operation is essentially the same. Guidance commands are derived in an analogous manner utilizing spin and nutation properties of the projectile.

The guidance seeker S comprises an array of circumferential slot antennas 42 with a lobe structure of concentric cones 44. There may be other antenna configurations which produce the same lobe structure. The concentric cone lobe structure 44 of the antenna 42 is preferably coaxial with the longitudinal axis 14 of the projectile 16. The antenna 42 and the antenna response of concentric cone lobes 44 are disposed stationary with respect to the projectile 16.

Figure 9:
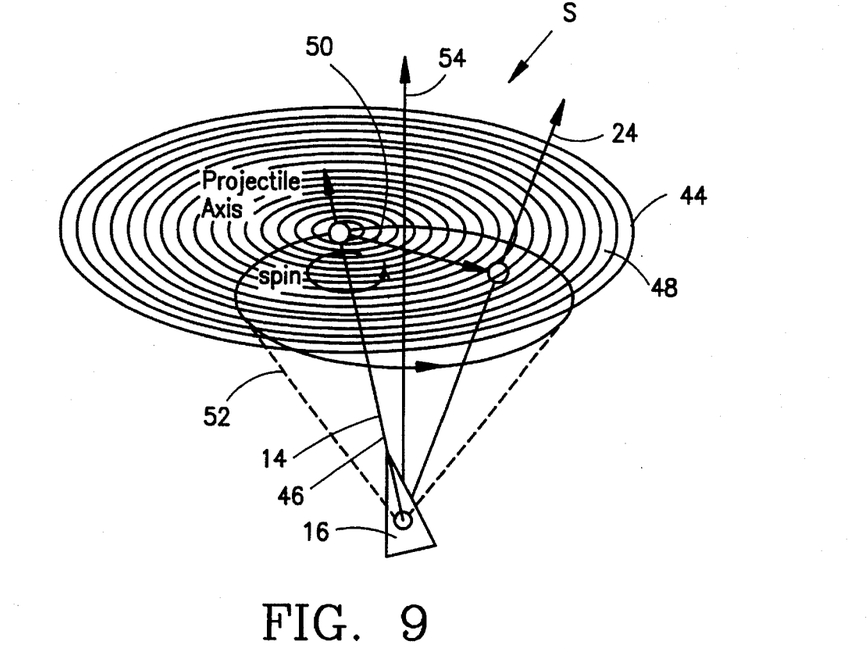
FIG. 9 is schematic perspective view of the various vectors involved in the operation of the guidance seeker of FIG. 8.

Referring to FIG. 9, for a distant source or target (not shown) which is fixed in space, rotation of the guidance seeker S about its axis 46 will not produce 30 amplitude changes (modulation) at the antenna output, since the angular position of the line-of-sight vector 24 does not change. In other words, the line-of-sight vector 24 to the source or target will remain either on a cone shaped antenna lobe 44, or in a space 48 between lobes, as a result of the circular symmetry of the lobe structure. Projectile spin will not produce any output signal modulation, as best shown in FIG. 2(a). Changes of the line-of-sight angle 50, on the other hand, due to motion of the projectile 16 or motion of the target (source) will cause modulation at the antenna output. Projectile nutation, as defined by nutation cone 52 and line-of-sight drift will thus directly translate into such modulation, as best shown in FIGS. 2(b) and 2(c).

In the case of projectile nutation, with no simultaneous movement of the line-of-sight vector 24 to the target, the angle 50 between the instantaneous projectile axis 14 and the line-of-sight vector 24 to the target is a periodic function of constant amplitude, as best shown in FIG. 4(a). As the projectile axis sweeps out the nutation cone 52, which is fixed in inertial space by being centered around the angular momentum vector 54, the line-of-sight angle 50, the angular distance between the projectile axis 14 and the line-of-sight vector 24 to the target, increases and decreases cyclically, returning to the original value after a complete cycle of nutation. The modulation at the antenna output will be a sequence of pulses, the number of which is equal to the number of antenna lobes 44 crossed by the line-of-sight vector 24. For a constant rate of nutation, and a line-of-sight vector 24 fixed in space, the number of pulses produced at antenna output per nutation cycle will be constant, as best shown in FIG. 4(b).

In the case of a changing line-of-sight vector 24, the angle between the instantaneous projectile axis 14 and the line-of-sight vector 24 to the target is still a periodic function, but no longer one of constant excursions. After a full nutation cycle this angle will not return to its original value, since the direction of the line-of-sight vector 24 has changed in the meantime. Instead, the amplitude of the periodic changes will increase or decrease depending on whether the line-of-sight vector 24 moves away from or towards the angular momentum vector 54, which is the axis of the nutation cone 52, as best shown in FIGS. 4(c) and 4(e). The number of antenna lobe crossings will exhibit analogous behavior and the number of pulses per nutation cycle produced at the antenna output will also no longer be constant. The number of pulses per nutation cycle will change proportionally with a change of direction of the line-of-sight vector 24 during the nutation cycle. The change of the pulse count per nutation cycle is thus proportional to the line-of-sight drift rate. The line-of-sight drift rate is therefore measured simply by pulse counting, which is a very simple operation. The guidance seeker S therefore lends itself ideally to proportional guidance, since its output signal is linearly dependent on the rate of change of the line-of-sight vector 24.

Generation of projectile guidance commands for the guidance seeker S is similar to that of the guidance seeker R. Circumferentially placed thrusters may be used to effect projectile course changes and the precise times at which these thrusters are to be activated are determined as follows. Two events in the nutation and spin cycles of the projectile 16 are determined. One is the time at which the three vectors, the instantaneous projectile axis 14, the angular momentum vector 54, and line-of-sight vector 24 are coplanar. The other is the time at which the projectile thrusters have the correct orientation for producing a thrust in the direction of the target. The first event takes place twice during the nutation cycle of the projectile 16, at the extremes of the cyclical variation of the instantaneous angle 50 between the projectile axis 14 and the line-of-sight vector 24. At these extremes, the direction of antenna lobe crossing reverses which is reflected as a long time gap or long pulse 40 in the output pulse sequence, as best shown in FIGS. 4(d) and 4(f). The second event takes place as many times during the spin cycle as there are circumferential thrusters. To ascertain correct thruster alignment, some circumferential encoding of the antenna lobe structure 44 has to be provided. For a nutation rate much slower than the spin rate, this can be accomplished by additional fan shaped lobes, equal in number to the circumferential thrusters on the projectile. Thruster activation commands are applied when the two described events coincide, as for example depicted by vector 56, as best shown in FIG. 10.

When the projectile 16 is not nutating, the projectile axis 14 is aligned with the angular momentum vector 54. This is a special case where the nutation cone 52 is collapsed to zero, as best shown in FIG. 10. In this case there is no cyclical change of the instantaneous angle 50 between the projectile axis 14 and the line-of-sight vector 24 to the target. For a stationary line-of-sight sight vector 24, there will be no output pulses from which to derive guidance commands. If this condition were to prevail for the entire trajectory of the projectile 16, no guidance commands would be needed, since the projectile 16 would be on an ideal intercept course with the target. Changes of the line-of-sight vector 24 would cause antenna lobe crossings, giving rise to output pulses, as best shown in FIGS. 4(d) and 4(f). The pulse count per unit time would again be proportional to the line-of-sight drift rate, but the number of pulses per unit time would be much smaller than in the nutating case.

Figure 10:
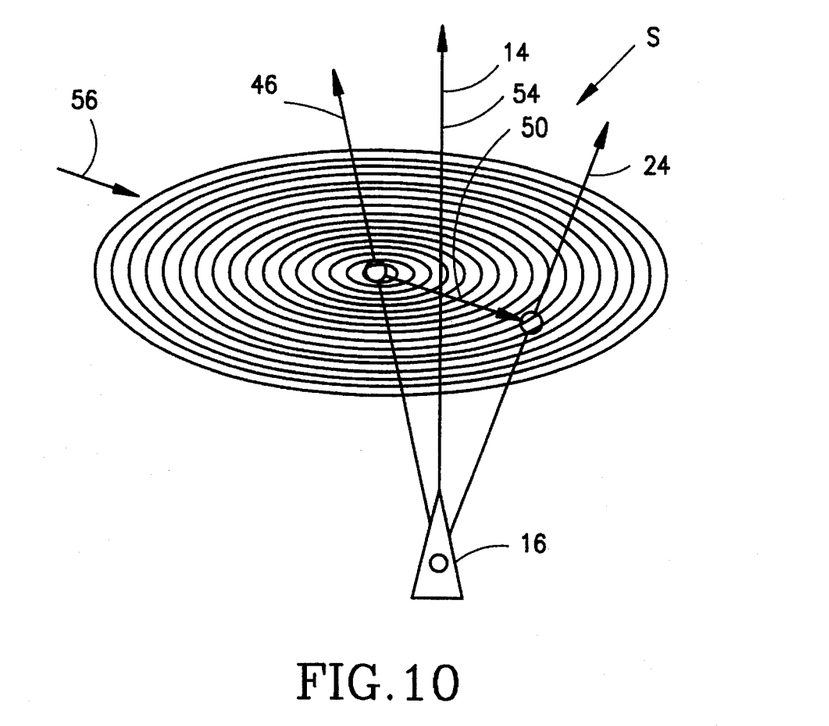
FIG. 10 is a schematic perspective view of the various vectors involved in the operation of the guidance 10 seeker of FIG. 8 when disposed in a non-nutating projectile.

The absence of nutation is put to advantage by slightly slanting the axis 46 of the guidance seeker S away from the axis 14 of the projectile 16, as best shown in FIG. 10. The effect of such offset guidance seeker axis (slightly side looking seeker) is similar to the effect of true nutation, at rate equal to the spin rate. In case of a projectile with a ratio of longitudinal to transversal moments of inertia of unity, the effect would be identical.

A side looking guidance seeker S further simplifies the control of a spinning projectile, since it does not require angular reference for circumferential encoding of the antenna lobe structure 44, as described above. The side looking guidance seeker S is the preferred embodiment. Angular reference is implicitly present in the output pulse sequence, which contains the reversal of the antenna lobe crossings at times when the line-of-sight vector 24, the projectile longitudinal axis 14 and the guidance seeker axis 46 are coplanar. The hiatus in the output pulse sequence which occurs at these points in time can be used as a signal for projectile control activation.

The lobe structure of an antenna configuration is uniquely determined by the Fourier transform of the aperture function. If a certain lobe structure is desired, it is only necessary to find its inverse Fourier transform. The resulting aperture function will yield the desired response.

An example of an antenna configuration for the guidance seeker S is an annular slot antenna, with a width much smaller than the diameter. The lobe structure of such an antenna is approximately defined by a zeroth order Bessel function. This Bessel function type antenna response has relatively high side lobes with definite nulls at regular intervals. One advantage of the annular slot antenna is its extreme compatibility with a small projectile. The annular slot can be made conformal with the circumference of the projectile's outer surface. It can be placed sufficiently behind the projectile nose cone, so that it does not interfere with the air flow. This arrangement would further be advantageous if the nose area of the projectile were to include an optical guidance seeker, such as the guidance seeker R described above.

Figure 11:
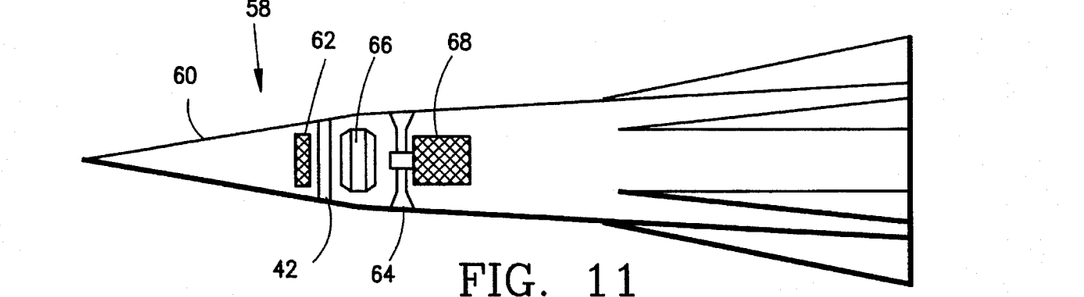
FIG. 11 is a schematic longitudinal view of a projectile using the guidance seekers of FIGS. 1 and 8.

A schematic diagram of a projectile 58 employing the guidance seekers R and S is disclosed in FIG. 11. The projectile 58 includes a Fresnel lens dome 60 for imaging the target on an integrated reticle and guidance processor 62, which includes the monolithic silicon chip 30. Circumferentially disposed thrusters 64 provide projectile course corrections as determined by the integrated reticle and guidance processor 66. Gas generator 68 is coupled to 30 the thrusters 64. Annular slot antenna 42 and millimeter-wave receiver 66 provide for the concentric antenna lobe structure 44. The millimeter wave receiver 66 detects and amplifies the energy emitted or scattered by the target, and converts this energy into electrical signals of sufficient signal-to-noise ratio for projectile guidance. Examples of such receivers are simple bolometric energy detectors, such as pyroelectric devices and autodyne (amplifier-detector) configurations and superheterodyne receivers, which have the best self-noise performance. Parametric amplification will further reduce self-noise, as well as cooling. Gallium arsenide and iridium phosphide millimeter wave integrated circuit components are available from various sources for the 94 GHz range. Integrated circuit components operating about 100 GHz are now commercially available.

The guidance seeker S will have a very small volume and low weight, utilizing monolithic millimeter wave componentry.

Since millimeter waves propagate well even under adverse meteorological conditions, the guidance seeker S can advantageously operate at long ranges from the object being tracked and under eroded visibility. With a dual mode guidance seeker, the optical guidance seeker R is used for greater accuracy in the short range and clear visibility environment, while the millimeter wave guidance seeker S is used for long range and poor visibility conditions, such as in fog and haze.

Figure 12:
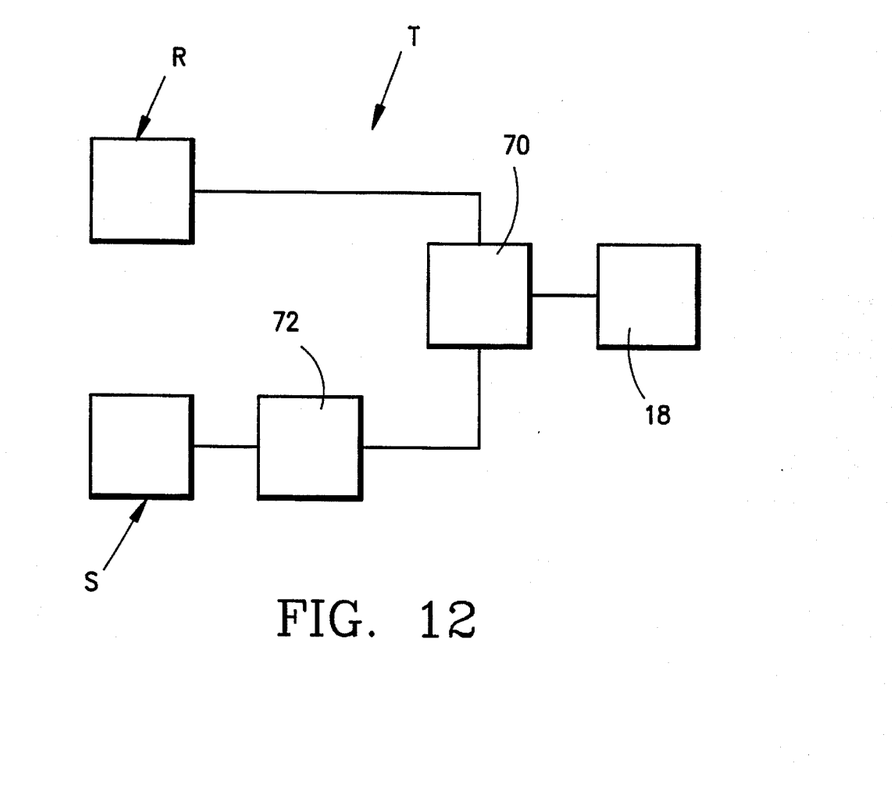
FIG. 12 is a schematic block diagram of a dual mode guidance seeker in accordance with the present invention.

A schematic diagram of a dual mode guidance seeker T is disclosed in FIG. 12. The guidance seeker comprises the guidance seeker R and the millimeter-wave guidance seeker S, sharing the same processing circuit 18 through a switch means 70. A range finder and/or visibility detector 72 or other suitable device is coupled to the guidance seeker S to guide the projectile 16 during its initial flight when it is typically relatively far from the target. The switch means 70 would direct the output from the guidance seeker S to the processing circuit 18 for any course corrections. At relatively close range to the target, the switch means 70 would switch over to the guidance seeker R the output of which would then be directed to the processing circuit 18.

The source of energy from the target that is received by the guidance seeker S may be from a separate radar that illuminates the area, the back-scatter energy reflected from the target being received by the seeker. The source may also include a small source of millimeter waves carried by the projectile. Still another source may be radiometric energy, such as black body radiation that emanates from the nose of the target as a result of frictional heating generated between the nose and the atmosphere.

Figure 13:
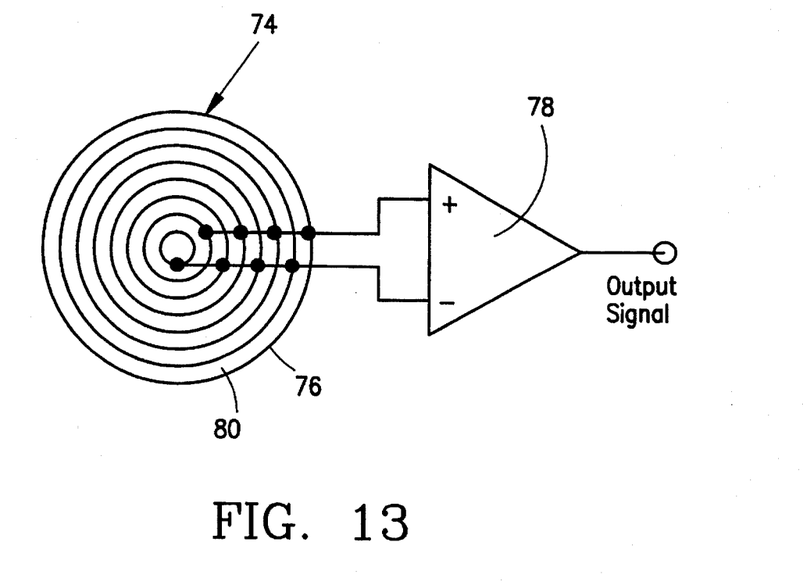
FIG. 13 is schematic plan view of another embodiment of a reticle in accordance with the present invention.

Another embodiment of a reticle 74 is disclosed in FIG. 13. The reticle 74 includes a plurality of individual concentric circles of photodetector zones 76 spaced from each other with spacings 80. A differential amplifier 78 has its inputs alternately connected to the photodetector rings or zones 76 such that an output signal is generated only when where is a difference in potential between the input terminals of the differential amplifier. It will be seen that only light intensity differences at adjacent photodetector rings 76 produce an output signal, while uniform illumination of the entire area of the reticle 74 does not. The reticle 74 is advantageously favorable for conditions with high background illumination levels. The photodetector zones 76 may be placed on a suitable semiconductor chip.

The photodetector rings 76 may be evenly spaced, with equal spacings 80. The photodetector rings may also be disposed with increasing spacings in the radial direction from the center of the reticle to its periphery, such that spacings 80 between adjacent rings 76 become progressively larger toward the periphery of the reticle. This arrangement of increasing spacings 80 advantageously provides a relatively stronger signature when the target image reverses direction during crossings of the circles 76.

It should be understood that the equal or progressively increasing spacings between the rings may also be applied to the reticle 4 shown in FIGS. 1, 5 and 6.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. A guidance seeker for a spinning projectile having an angular momentum vector, comprising:
   a) means for receiving radiation derived from a target and forming an image of the target, said receiving means for being disposed stationary with respect to the projectile;
   b) said receiving means having a plurality of concentric circles nutating about the projectile angular momentum vector such that the received radiation is modulated by the target image as the image moves across said concentric circles, said concentric circles having an axis;
   c) a detector coupled to said receiving means for receiving the modulated radiation, said detector adapted to generate an output in response to the received modulated radiation; and
   d) means for processing the output from said detector to determine the deviation of the target image from the axis of said concentric circles.

2. A guidance seeker as in claim 1, wherein:
   a) said receiving means comprises a reticle having a pattern of said concentric circles; and
   b) said detector is a photodetector disposed behind said reticle for receiving the modulated radiation through said reticle.

3. A guidance seeker as in claim 2, wherein:
   a) said detector output is a pulse train indicative of the drift rate of the target image with respect to said concentric circles axis; and
   b) said processing means comprises a pulse counter.

4. A guidance seeker as in claim 2, wherein:
   a) said reticle pattern is integrated on a silicon chip.

5. A guidance seeker as in claim 2, wherein:
   a) said reticle pattern comprises alternating opaque and transparent concentric circles.

6. A guidance seeker as in claim 2, wherein:
   a) said reticle pattern comprises alternating first and second color interference filters.

7. A guidance seeker as in claim 6, wherein:
   a) said first and second colors are red and blue, respectively.

8. A guidance seeker as in claim 1, wherein:
   a) said receiving means comprises an antenna array for generating said concentric circles from concentric lobes; and
   b) a receiver coupled to said antenna array for detecting the modulated radiation caused by the target image traveling across said concentric lobes.

9. A guidance seeker as in claim 8, wherein:
   a) said antenna array is a plurality of annular slot antennas.

10. A guidance seeker as in claim 8, wherein:
    a) said antenna array is a millimeter-wave antenna.

11. A guidance seeker for a spinning projectile having an angular momentum vector, comprising:
    a) a lens for gathering radiation derived from a target;
    b) a reticle disposed behind said lens, said reticle having a pattern of concentric circles nutating about the projectile angular momentum vector such that radiation passing therethrough is modulated by a target image formed thereon as the image moves across said concentric circles;
    c) a detector coupled to said reticle for receiving the transmitted modulated radiation, said detector adapted to generate an output in response to the received modulated radiation;
    d) said lens, reticle and detector defining an optical axis, and said lens, reticle and detector for being disposed stationary with respect to the projectile; and
    e) means for processing said output from said detector to determine the deviation of the target image from said optical axis.

12. A guidance seeker as in claim 11, wherein:
    a) said detector output is a pulse train indicative of the drift rate of the target image with respect to said optical axis; and
    b) said processing means comprises a pulse counter.

13. A guidance seeker as in claim 11, wherein:
    a) said reticle pattern is integrated on a silicon chip.

14. A guidance seeker as in claim 11, wherein:
    a) said reticle pattern comprises alternating opaque and transparent concentric circles.

15. A guidance seeker as in claim 11, wherein:
    a) said reticle pattern comprises alternating first and second color interference filters.

16. A guidance seeker as in claim 15, wherein:
    a) said first and second colors are red and blue, respectively.

17. A guidance seeker as in claim 11, wherein:
    a) said detector is a photodetector.

18. A guidance seeker for a spinning projectile having an angular momentum vector, comprising:
    a) an antenna array for receiving radiation reflected from a target and forming an image thereof, said antenna array having a response of concentric cone lobes, said antenna array and said concentric cone lobes for being disposed stationary with respect to the projectile and nutating with the projectile about the projectile angular momentum vector such that the received radiation is modulated by the target image as the image moves across said concentric cone lobes, said concentric cone lobes having an axis;
    b) a receiver coupled to said antenna array for detecting the modulated radiation; and
    c) means for processing the modulated radiation from said receiver to determine the deviation of the target image from the axis of said concentric cone lobes.

19. A guidance seeker as in claim 18, wherein:
    a) said antenna array is a plurality of annular slot antennas.

20. A guidance seeker as in claim 18, wherein:
    a) said antenna array is a millimeter-wave antenna.

21. A guidance seeker for a spinning projectile having an angular momentum vector, comprising:
    a) first and second means for receiving radiation reflected from a target and forming respective images of the target, said first and second receiving means for being disposed stationary with respect to the projectile;
    b) said first and second receiving means each having a plurality of concentric circles about an axis and nutating about the projectile angular momentum vector such that the received radiation is modulated by the respective target image as the image moves across the respective concentric circles;
    c) first and second detectors coupled to respective first and second receiving means for receiving the respective modulated radiation, each of said first and second detectors adapted to generate an output in response to the received modulated radiation;

d) means for switching between said first and second receiving means; and e) means for processing the output from one of said first and second means to determine the deviation of the respective target image from the respective axis.

22. A guidance seeker as in claim 21, wherein:

a) said first means comprises a reticle having a pattern of said concentric circles; and b) said first detector is a photodetector disposed behind said reticle for receiving the modulated radiation through said reticle.

23. A guidance seeker as in claim 21, wherein:

a) said second receiving means comprises an antenna array having an antenna response of concentric lobes; and b) said second detector is a receiver coupled to said antenna array for detecting the modulated radiation caused by the target image traveling across said concentric lobes.

24. A guidance seeker as in claim 23, wherein:

a) said antenna array comprises a plurality of annular slot antennas.

25. A method for guiding a spinning projectile to a target, the projectile having an angular momentum vector, said method comprising the steps of:

a) receiving radiation derived a target;

b) forming an image of the target;

c) providing a reticle having a plurality of concentric circles, said reticle being disposed stationary with respect to the projectile;

d) nutating the plurality of concentric circles about the projectile angular momentum vector such that the received radiation is modulated by the target image as the image moves across the concentric circles;

e) counting the number of circles crossed by the image per nutation cycle whereby the change of number of circles crossed between nutation cycles is proportional to the drift rate of the target image;

f) determining the direction of drift rate of the image; and g) correcting the trajectory of the projectile.

26. A method as in claim 25, wherein:

a) said receiving is performed with a lens.

27. A method as in claim 25, wherein:

a) said receiving is performed with a millimeter-wave antenna.

28. A method as in claim 25, wherein:

a) said counting is performed with a detector adapted to generate an output of pulse train such that a pulse is generated when a circle is crossed by the target image.

29. A guidance seeker as in claim 1, wherein:

a) said concentric circles are photodetector zones; and b) said detector includes a differential amplifier alternately connected to said photodetector zones.

* * * * *